Figure 1:
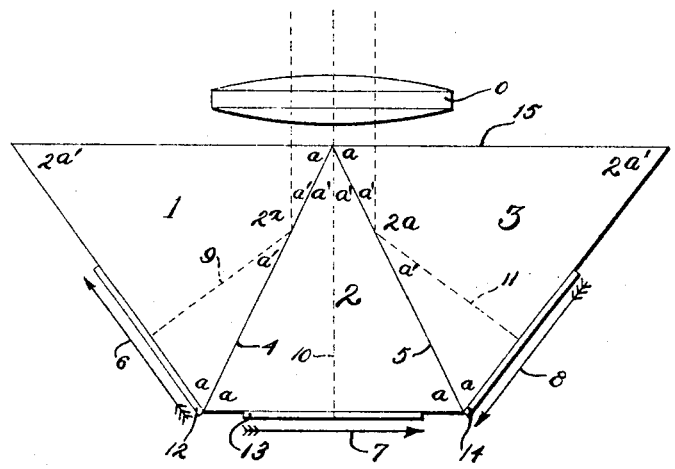

Jan. 26, 1932.  L. T. TROLAND  1,843,007

PLURAL IMAGE OPTICAL SYSTEM

Filed April 2, 1929

Inventor:
Leonard T. Troland
by Roberts, Cushman & Woodbury
Attys.

Patented Jan. 26, 1932

1,843,007

UNITED STATES PATENT OFFICE

LEONARD T. TROLAND, OF CAMBRIDGE, MASSACHUSETTS, ASSIGNOR TO TECHNICOLOR MOTION PICTURE CORPORATION, OF BOSTON, MASSACHUSETTS, A CORPORATION OF MAINE

PLURAL IMAGE OPTICAL SYSTEM

Application filed April 2, 1929. Serial No. 351,885.

This invention relates to photographic apparatus for forming a plurality of like images concomitantly from approximately the same point of view for use in the art of color photography by any additive or subtractive method and more particularly to a plural image forming train suited to color cinematography for simultaneously forming three like images.

For this purpose it has been proposed to employ two partial reflectors crossing at right angles in the axis of the objective, part of the light being reflected by one of the reflectors to form an image on one side of the axis, part being reflected by the other reflector to form a second image on the other side of the axis, and the remainder being transmitted by both reflectors to form the third image in a plane perpendicular to the planes of the other two images. However, this arrangement has serious disadvantages. For well-known reasons no more than one-fourth of the light can reach each of the three image areas and no advantage is gained by making the partial reflectors in other than a one-to-one ratio of transmission to reflection; and various modifications of this arrangement introduce shadows of the intersection or junction of the two reflectors.

Objects of the present invention are to provide a plural image forming train which overcomes the disadvantages incident to prior systems for the purpose, which permits the unequal division of the light for the three images while maintaining close geometrical likeness between all the images and substantially identical likeness between the two images recording most of the detail, which provides equal distances from objective to film, both in glass and in air, along the three light paths, which therefore permits accurate compensation in the objective for the lens effect introduced by the light-dividing prism unit according to Reissue Patent 14,983, which minimizes the number of glass-air or reflector-air surfaces between the objective and film, which is short measured along the light paths so that an objective of short focal length may be used, and which is generally superior to the plural image forming trains heretofore proposed for three color photography, particularly cinematography.

Referring to the aforesaid unequal division of light for the three images, by using the smaller component for the blue-record image (which records comparatively little detail because of the low luminosity of blue light), this image need not be focused from precisely the same point of view as the other two images, thereby permitting the partial reflectors to be so constructed and arranged as to afford more light for the red and green records while maintaining precision in the geometrical likeness between these two detail-recording images or subsqeuent registration purposes.

For the purpose of illustrating the genus of the invention typical embodiments are shown in the accompanying drawings which diagrammatically represent two plural image forming trains either of which may be used to form the three complemental images on the same or separate films respectively. In forming the images on successive areas of a single cinematographic film, the film may travel along a path defined by the three focal planes, with or without loops between the three film gates. According to the disclosure of Patent 1,454,418 granted May 8, 1923, the images of each set of three may be separated by one, two, three or four picture spaces on the film, all spaces (except at the ends of the film) being ultimately exposed by advancing the film three picture spaces between successive exposures.

The optical system shown in Fig. 1 comprises an objective O and a prism unit formed of three prisms 1, 2 and 3 cemented together with partial reflecting surfaces 4 and 5 therebetween. There are various known ways of forming the reflecting surfaces but they are preferably formed by spattering a thin deposit of silver or gold on one of the abutting surfaces of the prisms before they are cemented together, the thickness of the deposit depending upon the desired ratio of transmission to reflection. The shape of the prisms may be varied more or less, but they are preferably shaped approximately as shown in the figure where corresponding angles are correspondingly designated, *a* and *a'* being complementary and 2*a* and 2*a'* being twice the magnitude of *a* and *a'* respectively. Obviously the three images 6, 7 and 8 are formed by light transmitted along paths 9, 10 and 11 respectively, the images 6 and 8 being reversed with respect to image 7 because the component beams traversing paths 9 and 11 are reflected whereas the central component is transmitted without reflection. The transmission-reflection ratio of the partial reflectors 4 and 5 may be adjusted so that the light components passing to the respective focal planes are approximately equal or differ in any desired degree. The filters 12, 13 and 14 may be cemented to the emergent faces of the corresponding prisms or otherwise mounted in the paths of the component beams. While the differently colored filters may be distributed among the three locations as desired, if one of the three component beams is weaker than the other two the filter for the blue record is preferably located in the path of the weaker beam.

Among the salient characteristics of the embodiment of Fig. 1, it is to be noted that the partial reflectors 4 and 5 are located in planes intersecting at the ray-receiving face 15 of the prism unit, nearer the objective than the focal planes, and the line of intersection therefore does not cast objectionable shadows to the focal planes; the angle *a'* at which each partial reflector meets the axis of the objective is acute; that each reflector is confined to one side of said axis; and that each of the angles (*a* plus *a*) between juxtaposed emergent faces of the prisms is obtuse and is bisected by a partial reflector.

Figure 2:
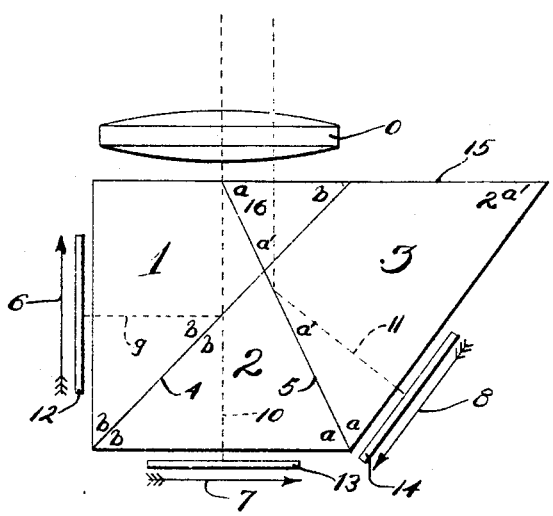

The embodiment shown in Fig. 2 is similar to that of Fig. 1, corresponding parts being correspondingly designated, but differs in that the partial reflector 4 is swung to the right about its lower edge so that it intersects the optical axis 10 remote from the ray-receiving face 15 and intersects the face 15 at the right-hand side of lens 0, thereby partially intercepting light throughout substantially the entire diaphragm aperture (not shown). The angles *b* are preferably 45° so that the focal planes 6 and 7 are at right angles. In this embodiment the prism unit comprises a fourth part 16. Here again the transmission-reflection ratios of the reflectors 4 and 5 may be varied as desired, and the filters may be variously distributed. However, owing to the fact that greater defects in definition, registry and distortion may be tolerated in the blue record because of the low luminosity of blue light, the blue record is preferably formed at 8 with the light from only one side of the aperture; and owing to the fact that the blue record requires a much smaller exposure than the red or green the reflector 5 may be thinner than reflector 4 so as to reflect only a small proportion of the incident light, although it may have a reflection-transmission ratio equal to or higher than reflector 4 and yet reflect less light to plane 8 than reaches planes 6 and 7 owing to the fact that it intercepts light throughout only half (or other proportion) of the aperture whereas planes 6 and 7 receive light throughout the whole (or larger proportion) of the diaphragm opening. In either case more light is available for the red and green records which supply more detail.

The system of Fig. 2 is superior not only in according more light to the red and green records, but also in exposing these definition contributing records from precisely the same point of view. In each embodiment the distances between objective and focal planes are short and equal, both in glass and air, and only two glass-air surfaces are presented by the light-dividing means to the light for each record.

It will be understood of course that considerable latitude is permissible in the choice of colors for three-color photography and therefore the references herein to red, green and blue are only illustrative. For example, the red is preferably a red-orange, the blue a blue-violet etc.

I claim:

1. Photographic apparatus of the type having a plural image forming optical train employing a common objective for the respective images, comprising a pair of partial reflectors disposed in planes making different angles with the axis of the objective and positioned to intercept different proportions of light from the objective.

2. Photographic apparatus of the type having a plural image forming optical train employing a common objective for the respective images, comprising a light-dividing prism unit having a single plane incident ray-receiving face and proximate emergent ray faces, one of said faces being substantially perpendicular to the axis of said objective and intermediate other of the faces which are disposed in planes making angles with the plane of the intermediate face, one of said angles being obtuse, and light-dividing surfaces approximately bisecting said angles, one of said surfaces being disposed in a plane intersecting said axis in the region of said receiving face.

3. Photographic apparatus of the type having a plural image forming optical train employing a common objective for the respective images, comprising a light-dividing prism unit having a single plane incident ray-receiving face and proximate emergent ray faces, one of said faces being substantially perpendicular to the axis of said objective and intermediate other of the faces which are disposed in planes making angles with the plane of the intermediate face, one of said angles being obtuse and the other approximately a right angle, and light-dividing surfaces approximately bisecting said angles, one of said surfaces being disposed in a plane intersecting said axis in the region of said receiving face and the other intersecting the axis more remotely from the receiving face.

4. Photographic apparatus of the type having a plural image forming optical train employing a common objective for the respective images, comprising a light-dividing prism unit having a single plane incident ray-receiving face and proximate emergent ray faces disposed in relation to each other at angles, one of which is obtuse and the other approximately a right angle, and a light-dividing surface approximately bisecting each angle.

5. Photographic apparatus of the type having a plural image forming optical train employing a common objective for the respective images, comprising a light-dividing prism unit having a single plane incident ray-receiving face and proximate emergent ray faces disposed in relation to each other at angles, one of which is obtuse and the other approximately a right angle, and a light-dividing surface approximately bisecting each angle, one of said surfaces being disposed in a plane intersecting said receiving face in the region of the axis of the objective.

6. Photographic apparatus of the type having a plural image forming optical train employing a common objective for the respective images, comprising a light-dividing prism unit having a single plane incident ray-receiving face and proximate emergent ray faces disposed in relation to each other at angles, one of which is obtuse, the other being smaller, and a light-dividing surface approximately bisecting each angle.

7. Photographic apparatus of the type having a plural image forming optical train employing a common objective for the respective images, comprising a light-dividing prism unit having a single plane incident ray-receiving face and proximate emergent ray faces disposed in relation to each other at angles, one of which is obtuse, the other being approximately a right angle, and a light-dividing surface approximately bisecting each angle.

8. Photographic apparatus of the type having a plural image forming optical train employing a common objective for the respective images, comprising a light-dividing prism unit having a single plane incident ray-receiving face and proximate emergent ray faces defining angles therebetween, and a light-dividing surface bisecting each angle, one of said surfaces intercepting light throughout substantially the entire aperture dimension and the other intercepting light throughout only a part of said dimension.

Signed by me at Boston, Massachusetts, this seventh day of March, 1929.

LEONARD T. TROLAND.